April 10, 1962     S. N. BUCHANAN     3,029,405
ELECTRICAL WIRING UNITS
Filed March 11, 1957     5 Sheets-Sheet 1
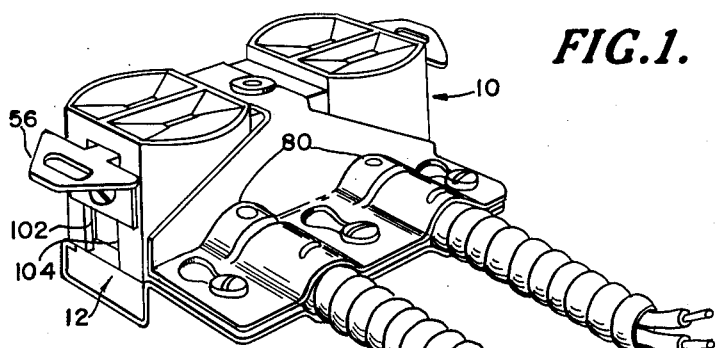
FIG.1.
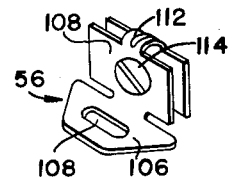
FIG.10.
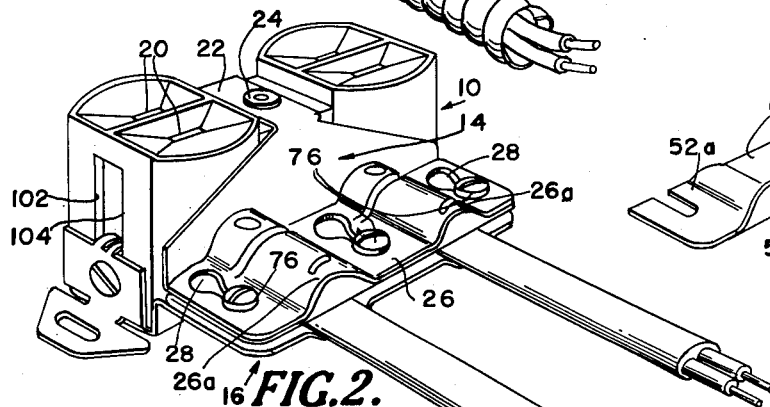
FIG.2.
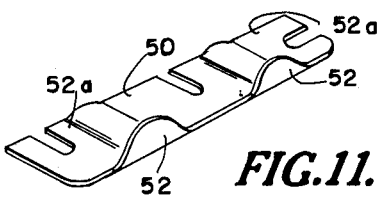
FIG.11.
FIG.17.
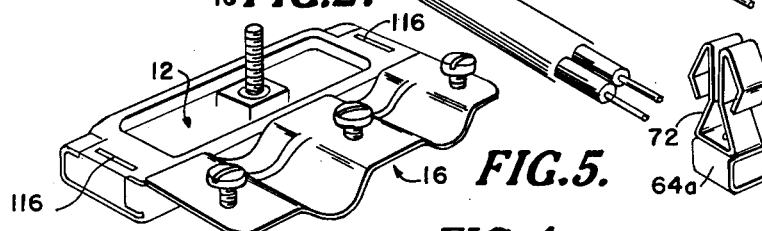
FIG.5.
FIG.4.
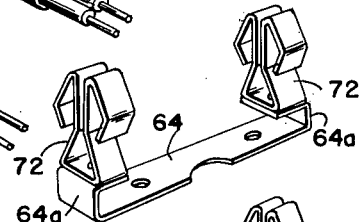
FIG.16.
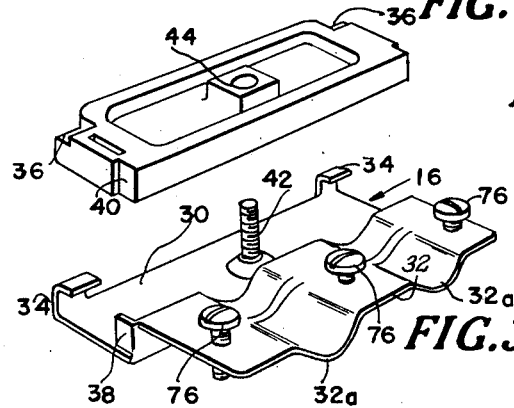
FIG.3.
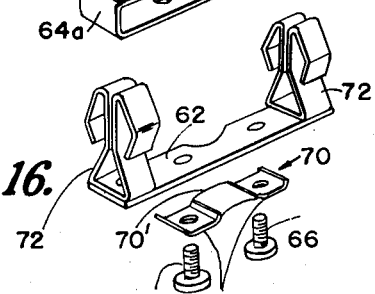
INVENTOR
Stephen N. Buchanan
BY Cushman, Darby & Cushman
ATTORNEYS April 10, 1962  S. N. BUCHANAN  3,029,405
ELECTRICAL WIRING UNITS
Filed March 11, 1957  5 Sheets-Sheet 2

INVENTOR
Stephen N. Buchanan
BY Cushman, Darby & Cushman
ATTORNEYS

April 10, 1962    S. N. BUCHANAN    3,029,405
ELECTRICAL WIRING UNITS
Filed March 11, 1957    5 Sheets-Sheet 3
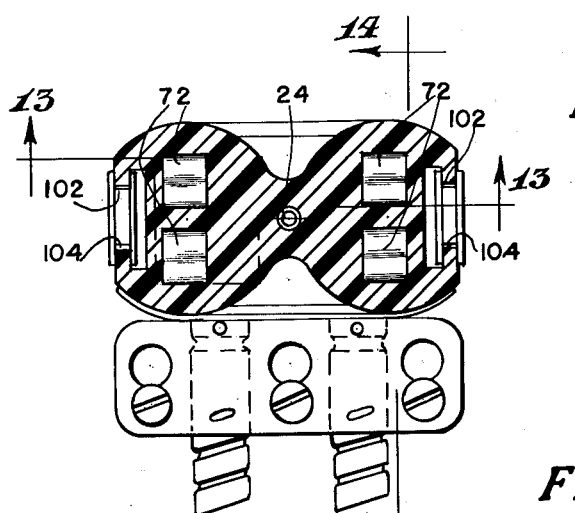
FIG. 12.
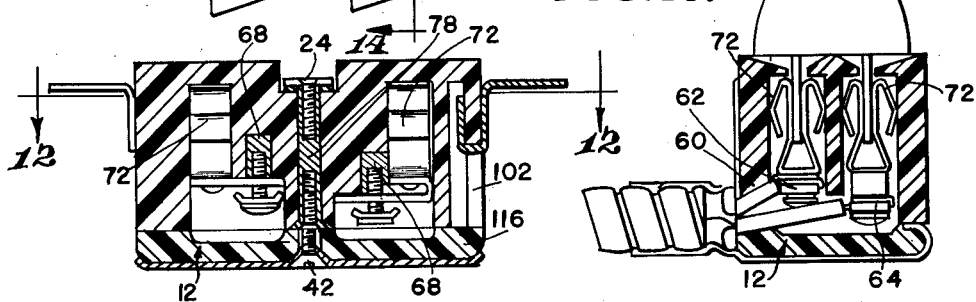
FIG. 13.
FIG. 14.
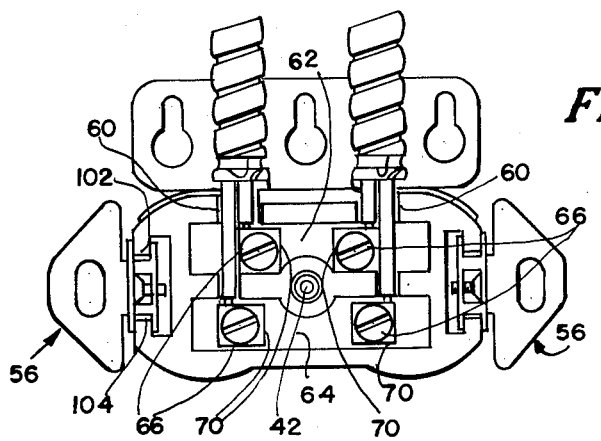
FIG. 15.
INVENTOR
Stephen N. Buchanan
BY Cushman, Darby & Cushman
ATTORNEYS April 10, 1962 S. N. BUCHANAN 3,029,405
ELECTRICAL WIRING UNITS
Filed March 11, 1957 5 Sheets-Sheet 4
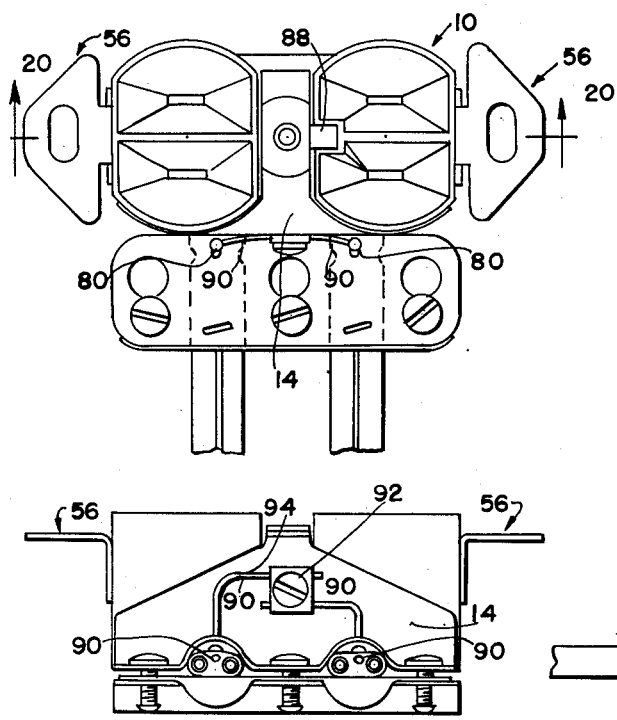
FIG. 18.
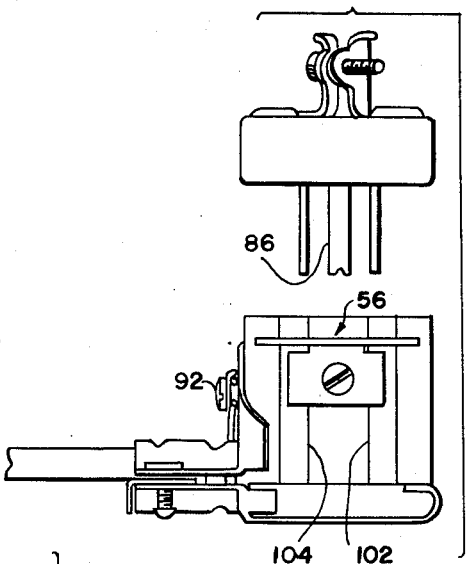
FIG. 21.
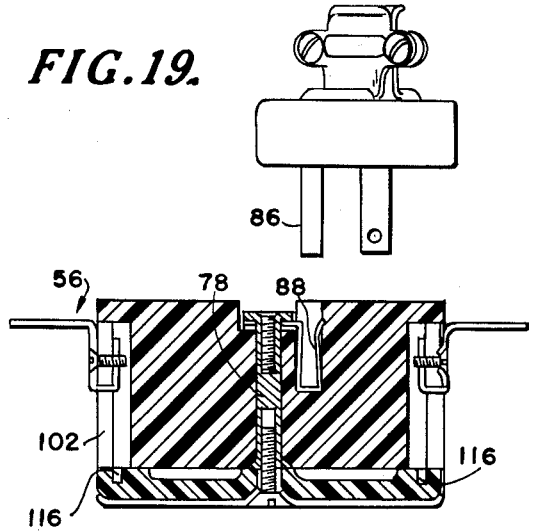
FIG. 19.
FIG. 20.
INVENTOR
Stephen N. Buchanan
BY Cushman, Darby & Cushman
ATTORNEYS

United States Patent Office 3,029,405
Patented Apr. 10, 1962

3,029,405
ELECTRICAL WIRING UNITS
Stephen N. Buchanan, Washington, D.C.
(Inc., Inc., 1502 N. Quincy St., Arlington, Va.)
Filed Mar. 11, 1957, Ser. No. 645,276
2 Claims. (Cl. 339—14)

This invention relates to electrical wiring units and particularly to plug-in receptacle devices.

Heretofore the provision of plug-in receptacle units for residential and commercial installation has involved extremely complicated components and procedures, with attendant expense in fabrication of the devices and in installation thereof. It has been the practice to first mount a box in or upon a wall or other support, to then use separate connectors to connect the cables to the box to leave sufficient lengths of conductors within the box so that a separate receptacle can be attached thereto while same is out of the box, and then to stuff the conductors and receptacle into the box. Following all this, a still further cover has been required. In accordance with various features of the present invention, a unitary receptacle device is provided. The construction of this receptacle is such that it may be used without any box (although it is also adaptable for mounting in existing boxes). Means for clamping cables is provided as a direct part of the receptacle. As an independent feature but usable with the present receptacle, adjustable mounting means are provided. These may be employed to mount the receptacle directly on a surface, in a suitable opening in a surface, or in a conventional box.

All of the many further objects of the invention in addition to those discussed above will become apparent from the following detailed description of illustrative embodiments, and from the appended claims.

The illustrative embodiments of the invention can be best understood with reference ot the accompanying drawings, wherein:

FIGURE 1 shows an assembled receptacle showing various features of the invention.

FIGURE 2 shows an assembled receptacle with modification for different type cable as compared with FIGURE 1.

FIGURE 3 shows a clamp member making up part of the completed receptacle.

FIGURE 4 shows a base member for a completed receptacle.

FIGURE 5 shows the clamp and base members of FIGURES 3 and 4 respectively, in combination.

FIGURE 10 shows an adjustable mounting means further shown in various positions in FIGURES 1, 2 and 6–9 and other figures.

FIGURE 11 shows a component for use in converting from the cable of FIGURE 1 to the cable of FIGURE 2.

FIGURE 12 shows a top sectional view of the receptacle of preceding figures, substantially along the line 12—12 of FIGURE 13.

FIGURE 13 shows a side sectional view subtsantially along the line 13—13 of FIGURE 12.

FIGURE 14 shows an end sectional view substantially along the line 14—14 of FIGURE 12.

FIGURE 15 shows a bottom plan view of the receptacle of the preceding figures, with the combination of FIGURE 5 removed.

FIGURE 16 shows a first terminal strip with contact members and associated terminal screws.

FIGURE 17 shows another terminal strip with contact members thereon.

FIGURE 18 shows a receptacle according to the invention and to the preceding figures, but modified for providing a grounding contact arrangement for the ground prong of an electrical plug.

FIGURE 19 shows a front elevational view of the receptacle of FIGURE 18.

FIGURE 20 shows a front sectional view substantially along line 20—20 of FIGURE 18, together with a plug in position for insertion.

FIGURE 21 shows an end elevational view of the receptacle of FIGURE 18, and a plug in position for insertion.

Figure 6:
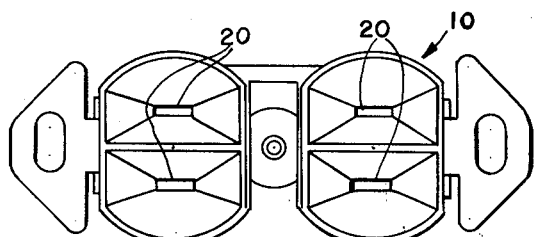
FIGURE 6 shows a top view of the receptacle of FIGURE 1.
Figure 7:
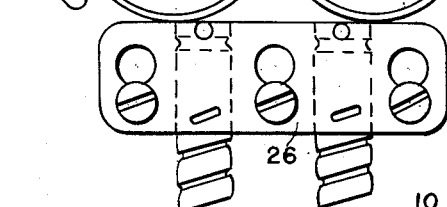
FIGURE 7 shows a front elevational view of the receptacle of FIGURE 1.
Figure 8:
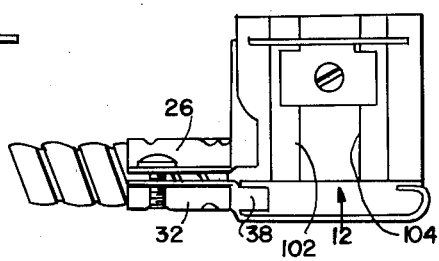
FIGURE 8 shows an end elevational view of the receptacle of FIGURE 1.
Figure 9:
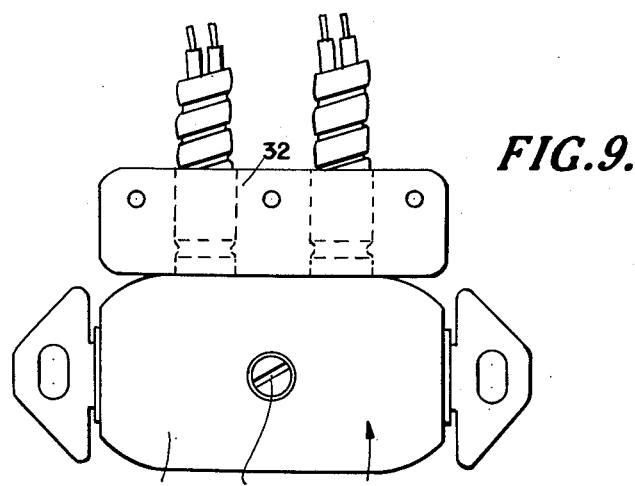
FIGURE 9 shows a bottom view of the receptacle of FIGURE 1.

Referring to FIGURES 1–9 in particular, the illustrative receptacle comprises a body member 10, a base member 12, a first or top clamp member 14, and a second or bottom clamp member 16.

The body member 10 may be made of a suitable so-called plastic material having electrical insulating properties and is characterized by a general top surface which presents the usual apertures 20 for receiving the prongs of an electrical plug. The body member otherwise is characterized by generally defined front and rear surfaces. Additionally, as will be more fully apparent hereinbelow, the body member is characterized by various chambers internally, and is open at the bottom as viewed in the drawings.

The base member 12 is also preferably of a so-called plastic material of electrical insulating properties and the upper surface of the base member is contoured to be fittable against the bottom of the body member.

The first or upper clamp member is preferably of metal. It includes a strap portion 22 which proceeds across the top of the body member 10 and can be permanently fixed thereto by a device such as a screw-threaded member 24. At the end of the strap member at the front of the receptacle as viewed in the drawings the part expands downwardly and outwardly to form against the front of the body member, and thence departs in a transverse plane to form a skirt portion 26 which is characterized by semi-cylindrical channels 26a for receiving cables therein. The top clamp member 14 is further characterized by keyhole type openings 28 for receiving headed screws for purposes of affixing the bottom clamp member 16 and base member 12 as will be explained.

The bottom clamp member 16 is provided with a panel area 30 and a skirt 32. The skirt 32 has channels 32a therein arranged to be complementary to the channels 26a of skirt 26 of the top clamp member 14. Bottom clamp member 16 is further characterized by U-shaped members 34 at the rear corners thereof. These are for engaging into recesses 36 in the base member 12. The bottom clamp member 16 is also provided with ears 38 for engagement in recesses 40 in the base member. The inter-engagement of these parts is clear from FIGURE 5 showing a bottom clamp member with base member seated therein. Suitable screw-threaded means 42 is provided for affixing the lower clamp member and base member to the bottom of the receptacle, this acting through aperture 44 in the base member.

FIGURE 1 shows so-called BX cable clamped between top clamp member 14 and bottom clamp member 16. FIGURE 2 shows type UF cable between the clamp members, in which case a blank 50 (FIG. 11) having ears 52 is also sandwiched between the skirts of the clamp members. Inasmuch as the type UF cable, or other cables of this type, is substantially flat as distinguished from the cylindrical BX cable, the blank 50 with ears 52 fills the unused part of the opening of the channel formed between the complementary parts 26a and 32a of the clamp members, and at the same time the substantially flat body area 52a behind the ears 52 serves the purpose of providing extended pressure upon the cable sheathing.

An adjustable mounting means designated as 56 and shown separately in FIGURE 10 is employed for mounting the receptacle. This mounting means and cooperating structure of the receptacle will be explained hereinafter in greater detail, as an independent inventive feature applicable not only to the particular receptacle of the present application, but to electrical units generally.

The internal construction of the receptacle can be best understood with additional reference to FIGURES 12–17. At the front of the body member near the lower edge thereof channels 60 (FIGS. 14 and 15) are provided for entering the conductors of the cables into the interior of the body member. When the unit is assembled, the front upper edge of the base member serves to close these openings. For a multiple outlet receptacle, two side by side terminal strips 62 and 64 are provided. Terminal screws 66 extend through these strips and into threaded sockets such as sockets 68 visible in FIGURE 13. A washer member 70 is provided to extend beneath the heads of the screws 66 for receiving the bared ends of the conductors of the cables. Washer member 70 is characterized by having two cupped areas 71 having apertures therein for receiving screws 66. The bared ends of the conductors will lie beneath the areas 71. However, the washer member 70 is further characterized by a bridge piece 70' extending between the portions 71. Bridge piece 70' is to be resilient and is arched in its unrestrained condition. Therefore, the areas 71 will normally tend to lie away from the terminal strip 62 (or 64) so as to readily facilitate the insertion of the bared ends of the conductors between the portions 71 and the terminal strip 62 (or 64). Terminal strips 62 and 64, and a set of screws 66 and washer 70 are shown in FIGURES 16 and 17. On the terminal strips are mounted contact members 72 for receiving plug prongs inserted through the openings 20 in the top of the body member.

Attention is drawn particularly to FIGURE 15 to show that the openings 60 in the front bottom edge of the body member are aligned substantially with the terminal screws 66 of the respective terminal strips 62 and 64. Accordingly, only the shortest lengths of conductors are required to extend from the ends of the cable sheathing to the terminal screws. Note that the conductors may be dressed in a straight path and there is no requirement for stuffing of conductors into a confined space. As best shown in FIGURE 14, but also visible in FIGURE 13, the terminal strip 62 most adjacent to the entry of the conductors is at a higher level than the more remote terminal strip 64. The offsets 64a of terminal strip 64 (FIG. 17) permit the terminal strip 64 to be mounted against a portion of the body member which is lower than that against which the strip 62 is mounted, and still the contact members 72 on strip 64 are at the same height as those on strip 62.

It will be understood that the provision of a single outlet, with one cable leading into the receptacle unit, forms the basis of the present invention notwithstanding that the receptacle can be multiplied for a number of outlets, with or without means for entering a second cable. Provision is normally made for at least two cables to enter the receptacle for splicing the cables by use of the terminal screws and strips. It will also be appreciated that the number of terminal strips could be multiplied for three or more conductor systems.

In use, with either the cylindrical type cable as in FIGURE 1 or the substantially flat cable as in FIGURE 2, the first step is to cut the conductors extending from the termination of the cable sheathing to predetermined lengths as suggested in FIGURE 15. Obviously, this could be done with a special tool to automatically insure the correct length of the respective conductors, but without any excess. The insulation on the conductors is stripped just at the ends thereof to be received under the washer portion 71. The top clamp member 14 will be normally affixed to the body member 10. The cable sheathing is laid against the skirt of the top clamp member, the bared ends of the conductors passed beneath the washer portion 71 and the terminal screws 66 tightened. Additionally, any fiber bushings required at the end of the BX type cable sheathing can be in place. The next step is to slip the heads of clamping screws 76 through the enlarged portions of the keyhole openings 28 in the skirt of the top clamp member and then slide the lower clamp member and the base portion therein forwardly so that the screws 76 seat in the narrow portions of the keyhole openings in the top clamp member. These screws can now be tightened, and additionally, the screw-threaded member 42 can be tightened so as to directly secure the base member and bottom clamp member to the body member. For this purpose a screw-threaded socket device 78 (FIG. 13) may be secured in the body member. The unit is now ready for mounting on the desired surface by use of the mounting means 56, explained in greater detail hereinafter.

The top clamp member 14 may be provided with apertures 80 for the purpose of inspecting to determine if any required fiber bushings have been employed.

Figure 22:
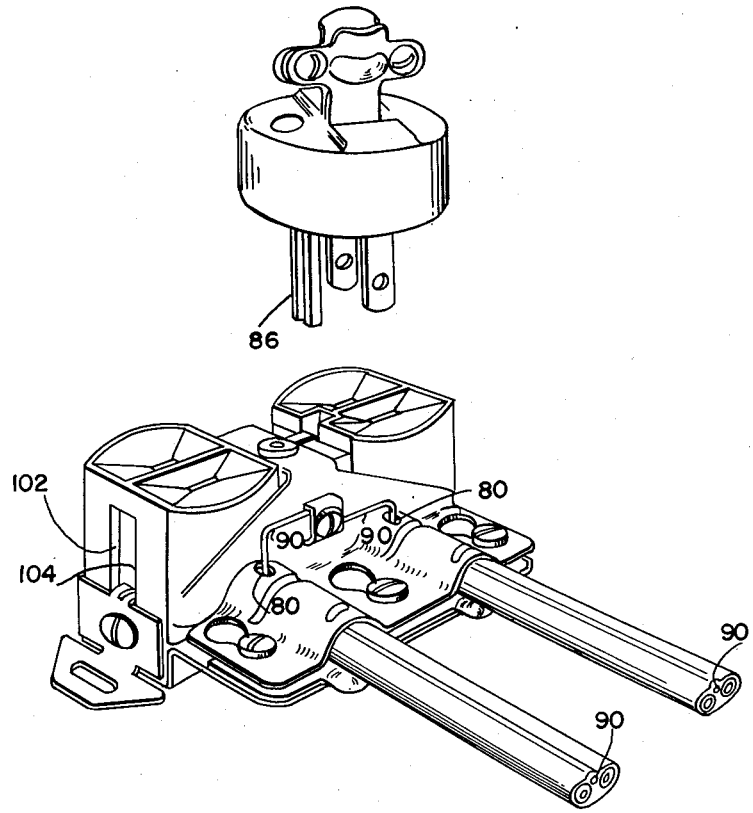
FIGURE 22 shows an isometric view of the receptacle of FIGURE 18, with plug in position for insertion.

There is a growing requirement in the United States that various appliances be provided with a plug having a grounding prong. An illustrative receptacle quite similar to that described in FIGURES 1–17 but providing for a grounding circuit is shown in FIGURES 18–22. A typical plug having a third or ground prong 86 is shown in FIGURES 20 and 22 and the receptacle is provided with a contact member 88 (FIGS. 18 and 20) for receiving prong 86. It is apparent that the provision of this extra contact member could be duplicated for the other receptacle outlet if desired. Contact member 88 is electrically connected with the screw-threaded anchor member 78 (FIG. 13) and it will be recalled that the strap portion 22 of the top clamp member 14 is affixed to the anchor member 78. Where BX cable is employed, the metal sheathing of this cable serves as the ground conductor. Clearly, there will be electrical engagement between the BX sheathing and the top clamp member 14, and thus an electric circuit is completed to contact member 88.

Where a cable of the UF or Romex type is employed and a ground circuit is demanded, this cable is provided with a third conductor. See conductors 90 in FIGURES 19 and 22. When the sheathing is removed from the ends of the cables, the conductors 90 may be led out of the inspection holes 80 and a terminal screw 92 and washer 94 may be employed for electrically connecting the ends of the conductors 90 to the top clamp member 14. Again, an electric circuit is thereby made to the contact member 88 for the ground prong 86 of the plug.

The mounting means 56 will now be explained. This feature is common to all of the various views of the receptacle of FIGURES 1–17 and the slightly modified receptacle of FIGURES 18–22. It is to be understood that this mounting means applies not only to the illustrated receptacles and all of the equivalents thereof, but also to any electrical unit or other type of unit which is to be adjustably mounted with respect to a supporting surface. Therefore, the inventive feature now to be described can be considered entirely independent from the other inventive features herein.

The mounting means consists of the component designated as 56 and shown separately in FIGURE 10, and also cooperating rail portions 102 and 104 as shown in FIGURES 1, 2, 12, 13, 15, 20, 21 and 22. With particular reference to FIGURE 10 there is provided an ear portion 106 having an aperture 108 therein for receiving a screw or similar device for affixing the ear portion to a surface. Fastened to the ear portion 106 is a first clamp portion 108 of length sufficient to more than bridge the gap between rails 102 and 104 of the unit to be mounted. There is further provided a second clamp portion 110 lying parallel to but spaced apart from the first clamp portion 108. The respective clamp portions 108 and 110 are joined by a bridge piece 112 of lesser length than the clamp portions so that it will pass between the rails 102 and 104. Finally, a screw 114 is provided for free movement in an aperture in the clamp portion 108 but for threaded retention in the clamp portion 110. It is preferable to have the ear portion affixed at substantially right angles to the first clamp portion 108 and at one edge thereof, the lower edge as shown in FIGURE 10, in combination with the bridge piece 112 at the upper or opposite side of the first clamp member 108.

In operation the clamp member may be placed between rails 102 and 104 either in the position as shown in FIGURE 1 or in the inverted position as shown in FIGURE 2. The position may be changed, in the case of the particular receptacle shown in the various figures of this application, by removal of the base member to provide access between the rails 102 and 104. Once the position of the mounting means is determined, the screw 114 may be tightened and the clamp portions 108 and 110 frictionally engage the rails 102 and 104.

By virtue of the placement of the bridge piece 112 with respect to the ear portion 106 and the ability to invert the unit, a wide range of adjustment is possible, as will be clearly apparent from the various figures of the drawings. To provide the greatest downward placement of the ear portions, the base member 12 may be provided with channels 116 of sufficient width to accommodate the second clamp portion 110. See the channels 116 in cross-section in FIGURES 13 and 20.

Reference is now made to FIGURES 23–26 wherein a modified form of receptacle is illustrated. In this case the body portion of the receptacle is designated by reference character 10' and the base by 12'. For each cable entry point the body is characterized by a channeled portion 150 and the base is provided with a complementary portion 152. Suitable means such as screw-threaded means designated by reference character 154 is the primary means for maintaining the body and base members fixed together. When the body and base are so maintained together some clamping action between portions 150 and 152 is exerted upon the cable sheathing. However, the primary clamping of the receptacle to the cables is intended to occur between an upper clamping member here designated 156 and a lower clamping member 158. These clamping members engage the cable somewhat outwardly of the receptacle body and base as can be observed from FIGURES 23 and 24. The lower clamp member 158 is characterized by an arm 160 which extends beneath the base 12' and is engaged by the screw-threaded means 154. Member 160 preferably extends in a plane and therfore strain applied to the cables from the side of the combined body-base is immediately absorbed by member 160. The upper clamp member 156 is characterized by an extension 162, this bending upwardly as at 164 and then having a preferably right-angled hook portion 166 for seating in a detent 168 in the body 10'.

It will be understood that the above described embodiments of the invention are only illustrative, and the true scope of the invention is to be determined from the appended claims.

What is claimed is:

1. In an electrical unit, a body member, a base member interfitting with the body member, a first clamp member affixed to the body member, a second clamp member affixed to the base member, the first and second clamp members having complementary portions extending outwardly from the interfitted body and base members for clamping at least one cable therebetween and wherein the body member has at least one set of openings and associated contact members therein for receiving at least two main conducting prongs of an electrical plug and also a grounding prong of the plug, and wherein the unit includes electrically conductive means for interconnecting the contact member for the grounding prong with at least one of said clamp members.

2. A unit as in claim 1 wherein the clamp member to which the ground prong contact member is electrically connected includes means for affixing to said clamp member the grounding conductor of an electrical cable clamped between the first and second clamp members.

References Cited in the file of this patent

UNITED STATES PATENTS

| | | |
|---|---|---|
| 1,183,516 | Anderson | May 16, 1916 |
| 1,821,031 | Peterson | Sept. 1, 1931 |
| 1,917,450 | Lademann | July 11, 1933 |
| 1,979,091 | Alsaker et al. | Oct. 30, 1934 |
| 2,262,712 | Shenton | Nov. 11, 1941 |
| 2,568,942 | Bindel | Sept. 25, 1951 |
| 2,712,123 | Wibell et al. | June 28, 1955 |
| 2,760,173 | Cunningham | Aug. 21, 1956 |

FOREIGN PATENTS

| | | |
|---|---|---|
| 516,174 | Germany | Jan. 19, 1931 |
| 661,494 | France | Mar. 5, 1929 |